United States Patent [19]

Ahladas

[11] Patent Number: 5,519,600
[45] Date of Patent: May 21, 1996

[54] THREE-PHASE SELF-BALANCING POWER SUPPLY

[75] Inventor: Steven J. Ahladas, Highland, N.Y.

[73] Assignee: International Business Machines Corporation, Armonk, N.Y.

[21] Appl. No.: 414,990

[22] Filed: Mar. 31, 1995

[51] Int. Cl.⁶ .................................................. H02M 7/217
[52] U.S. Cl. ................................ 363/88; 363/52; 361/88; 307/58
[58] Field of Search .................................. 363/52, 53, 54, 363/71, 84, 87, 88; 361/91, 92, 88; 307/58

[56] References Cited

U.S. PATENT DOCUMENTS

| | | | |
|---|---|---|---|
| 3,641,419 | 2/1972 | Koltuniak et al. | 321/8 C |
| 3,663,828 | 5/1972 | Low et al. | 307/83 |
| 4,074,346 | 2/1978 | Riley | 363/50 |
| 4,177,389 | 12/1979 | Schott | 307/64 |
| 4,628,460 | 12/1986 | Frederich | 364/480 |
| 4,672,297 | 6/1987 | Gotoh et al. | 322/28 |
| 4,825,328 | 4/1989 | Izaguirre, Sr. | 361/90 |
| 4,973,902 | 11/1990 | Dhyanchand et al. | 324/158 HG |
| 5,369,541 | 11/1994 | Normet | 361/85 |

OTHER PUBLICATIONS

Fuld, B. et al., "A Combined Buck and Boost Power-Factor-Controller for Three-Phase Input", 5th European Conf. on Power Electronics and Applications, 1993, V. 7 IEEE, pp. 144–148.

Fuld, B. et al., "Analysis and Design of a Wide Input Range Power Factor Correction Circuit for Three-Phase Applications", IEEE Applied Power Electronics Conference, 1993, pp. 299–305.

Primary Examiner—Peter S. Wong
Assistant Examiner—Adolf Berhane
Attorney, Agent, or Firm—Lawrence D. Cutter

[57] ABSTRACT

In a delta-connected power supply system, phase switching circuits are employed and are activated during the failure of one of N+1 converter units. This activation is employed even though there has been no outage in any one of the input phases. The result is two operating converters running in effect as three-phase converters. Since each of the converters then acts as a full wave three-phase bridge with a resistor load, the line currents are perfectly balanced although unity power factor is not maintained during this non-normal mode of operation. In such circumstances, higher power factor is temporarily sacrificed to achieve continuous operation and therefore higher overall system reliability.

6 Claims, 5 Drawing Sheets

THREE-PHASE SELF-BALANCING POWER SUPPLY

BACKGROUND OF THE INVENTION

The present invention is generally directed to power supplies for electronic equipment which is to be supplied from three-phase power sources. More particularly, the present invention is directed to a power supply containing a plurality of power conversion units which are capable of three-phase power switching. Even more particularly, the invention is directed to a power supply configuration which is resistant to failure in one of the converter units.

When electronic or other equipment must be provided with more than three kilowatts of electric power, it becomes very convenient, if not necessary, to employ three-phase power input sources. Typically, in three-phase power supply units, three separate converter units are employed in either a delta or wye connection. There is, however, a greater probability of failure present in such systems merely because a failure can occur when any one of the converters and/or regulators employed fails. Accordingly, it is desirable to provide a mechanism for continued appropriate operation in the event of a single converter unit failure.

Similar systems have been designed which provide three-phase power supplies which continue operation even after the failure of a single one of the supply phases. In such circumstances, the solution proffered has been the opening of switches which shut down the power supply portion in that particular unit. However, this is not always desirable and it would certainly be preferable to continue operation of the unit where appropriate. However, in the event of failure in one of the phases, this is not possible. However, in circumstances in which reliability issues are directed to failure of the converters or regulators themselves, it is possible, in accordance with the present invention, to provide circuits to perform a phase switching operation as opposed to completely shutting down the subject unit.

Additional power supply design concerns are also addressed by the present invention. In particular, when a converter failure occurs, and particularly, when only two converters are carrying the load instead of three, this results in an unbalanced load since, in effect, one leg of a delta-connected converter is open. The resulting line current will therefore increase significantly in one of the three phases. The increased current drawn during such conditions would force circuit designers to construct power feed circuits which are sized for the higher currents which are typically seventy-five percent higher than would otherwise be seen. This aspect has two negative consequences. Firstly, it results in a higher power system cost. Secondly, because of the higher current requirements, it may require an end user to upgrade power feed requirements to higher levels than would otherwise be needed.

The AC/DC power converters described herein are preferably arranged in a so-called N+1 configuration wherein each unit includes a DC power converter and wherein N+1 units are connected in a delta configuration. While the power converter is configured to receive three-phase power, normal operation only involves a single phase pair. When one of the N+1 converter units fails, system availability of bulk power is assured as N converters are still operational and are available to provide power to the load. However, when converter failure does occur, the remaining operational converters experience increased power demands since fewer units are available to carry the load. The redundancy feature is an important aspect for providing overall system reliability. This is particularly true when the power supplies are being used to run large computer systems, where the demands for reliability and availability are high.

When one of the N+1 converters fails in such a configuration, the load is still assured of bulk power as N converters are still operational. In order to maintain bulk power, it is necessary for the two operational converters to provide an increased level of power which compensates for the loss of the third converter. Although bulk power can generally be maintained, one leg of the delta-connected converter is open and the input views the delta connection as an unbalanced load. As a result, the line currents on one of three lines will increase significantly in order to maintain power. More importantly, however, it is possible that the current imbalance will cause an upstream three-phase circuit breaker to trip, thus causing a system outage. In terms of reliability and/or availability, this is not by any means a desirable event. Accordingly, it is very desirable to have a regulator and/or converter configuration which is self-balancing during the failure of one of the regulators.

SUMMARY OF THE INVENTION

In accordance with a preferred embodiment of the present invention, a self-balanced, three-phase power supply comprises a plurality of power converter units which accept three-phase power input for rectification of two phases and yet which are also capable of switching to the use of the other power phase input in the event of a phase failure. There is also provided a means for indicating the functional status of each of the converter units. Likewise, there is provided a means for monitoring each of the converter units from other converter units to determine that they are in a functioning state. In those circumstances in which negative functionality is indicated, phase switching circuits are activated which enable continued operation.

Accordingly, it is an object of the present invention, to reduce the probability that a converter unit failure will cause the tripping of upstream circuit breakers.

It is also an object of the present invention to provide increased reliability and availability for electronic equipment including large scale computer processors, especially parallel processing units.

It is a still further object of the present invention to provide a power conversion system which receives three-phase power input and which supplies DC power to electronic equipment in a continuous manner in the event that one of the converter units and/or phases fail.

It is yet another object of the present invention to provide phase switching capabilities in the event of converter unit failure.

Likewise, it is another object of the present invention to lower a customer's three-phase power feed requirements.

Additionally, it is an object of the present invention to permit the design of three-phase power feed circuits having a lower maximum current design rating.

It is yet another object of the present invention to provide power systems which do not require a customer to upgrade his power feed requirements for various forms of electronic equipment including large scale mainframe computer devices.

It is a still further object of the present invention to enhance the design and operational characteristics of N+1 configuration based power supply systems.

It is also an object of the present invention to achieve the objectives cited herein with a relatively few number of electrical circuit components which have a minimal cost associated therewith.

It is therefore also seen that it is an object of the present invention to provide input power feeds which are sized for a lower current for balanced three-phase load conditions, thus resulting in lower manufacturing costs and also, in lower installation costs.

Lastly, but not limited hereto, it is an object of the present invention to permit continued power system operation in the event of failure of a single converter unit, albeit in a somewhat degraded state with respect to power factor requirements.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
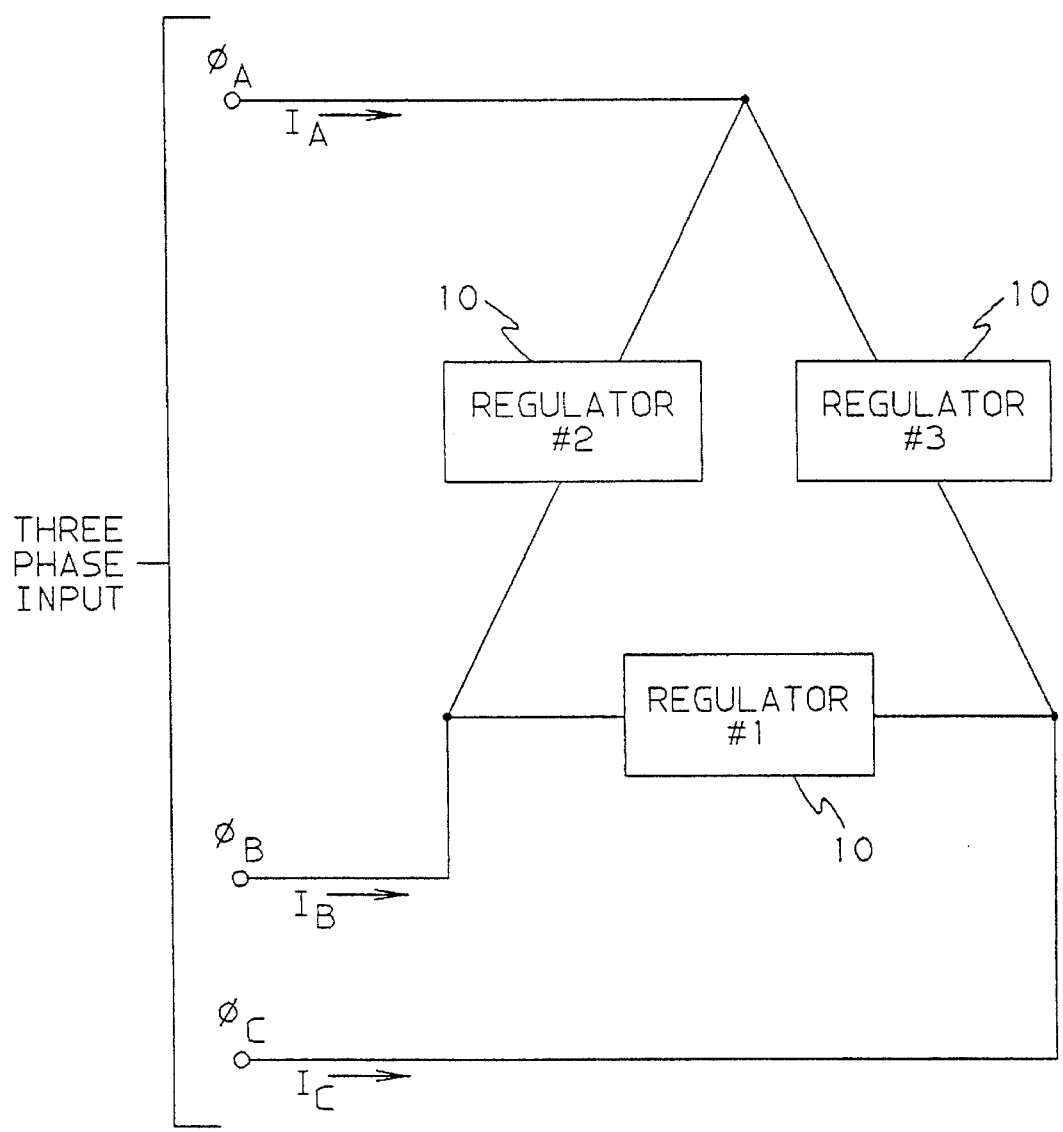
FIG. 1 illustrates, in block diagram form, a delta connection for three regulator circuits supplied from a three-phase power input connection (For convenience only, DC power-out is not shown here).

FIG. 1 illustrates a delta connection of three regulator units 10. In the present invention, the delta connection is a decidedly preferred embodiment. However, it is noted that a wye connection may also be employed. However, such wye connections are more expensive to implement and are more complicated to construct in terms of the desired phase switching capability.

Regulator #1, regulator #2, and regulator #3 also preferably comprise identical units having the same part number. Furthermore, it is noted that regulators 10 include converter units which operate to receive two phases of a three-phase supply and to convert this AC source to DC power. In preferred embodiments of the present invention, the DC output from these three regulators is tied together to provide a single current source for a given piece of electronic gear.

Figure 2:
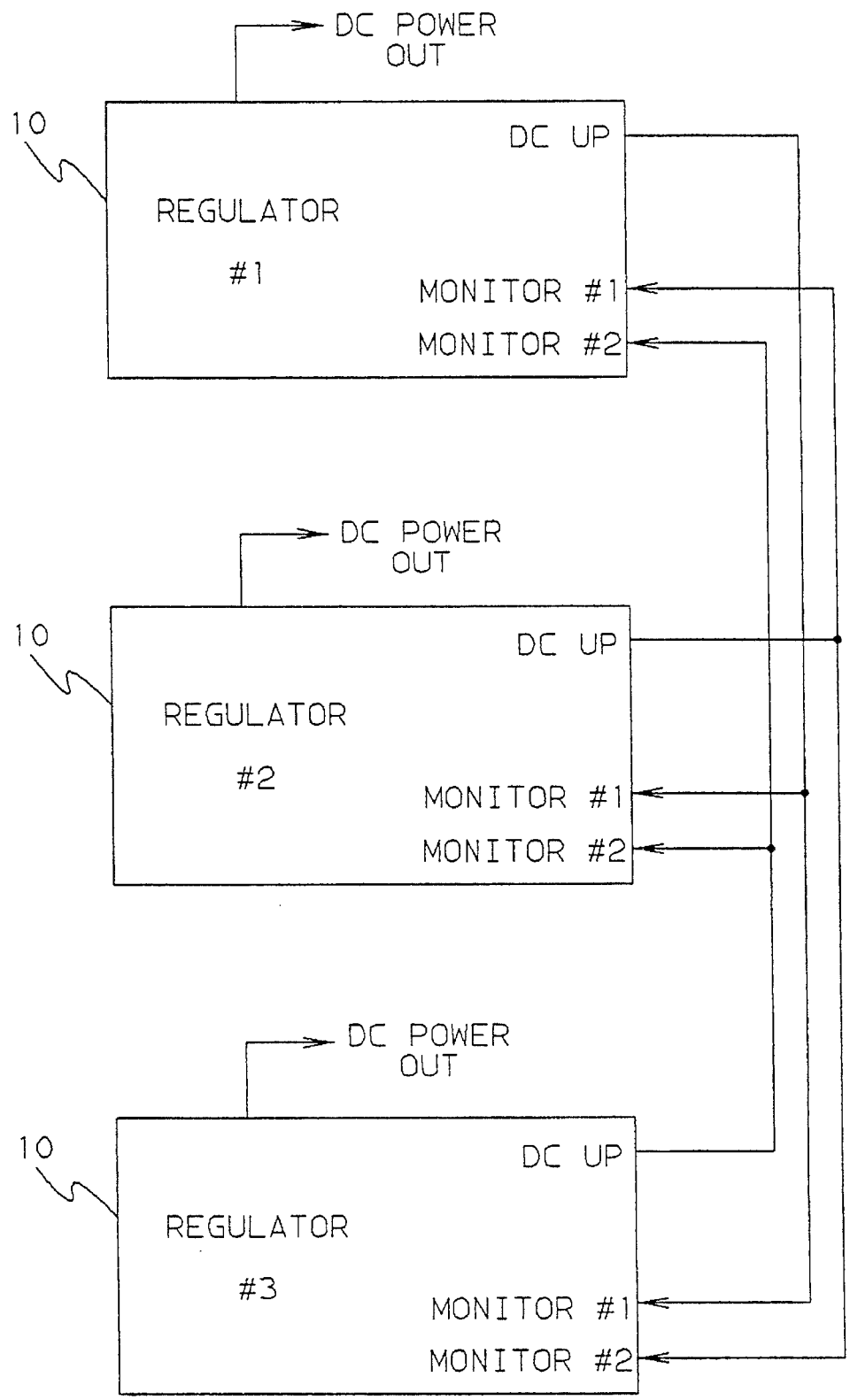
FIG. 2 is a block diagram illustrating one embodiment of the present invention showing the interconnection between regulators which monitor one another for proper operation.
Figure 3A:
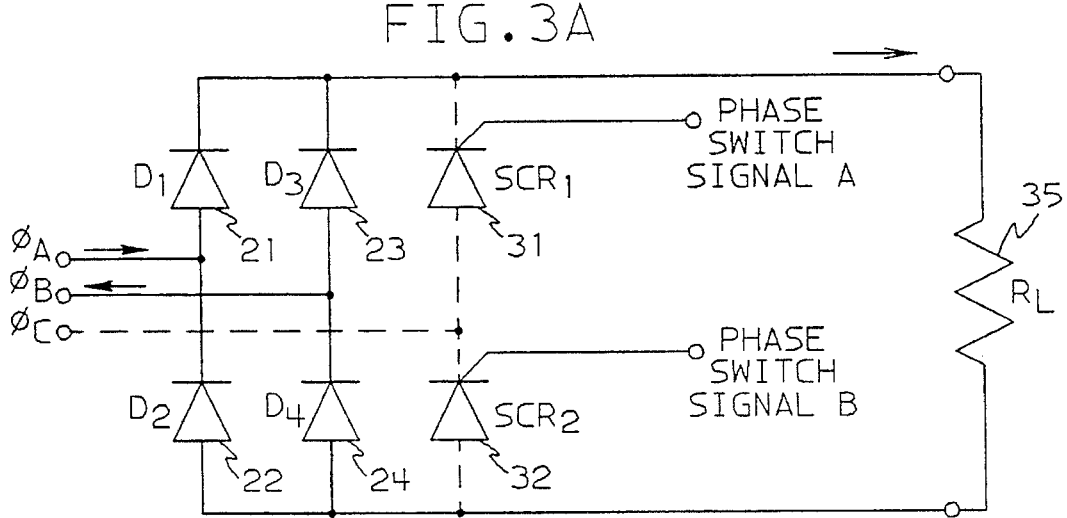
FIG. 3A is an electrical circuit schematic diagram illustrating a typical bridge circuit switching converter in accordance with the present invention.

Each of regulators 10 includes a circuit for providing a signal indicating that the proper current is being supplied by the converter unit within the regulator. For the situation in which there are three regulators, as shown in FIG. 2, it is seen that this "DC UP" signal is supplied to each of the other two regulators. In particular, it is seen that regulators 10 also include two or more monitor input ports (monitor #1 and monitor #2) which receive the DC UP signal from the other regulators. The connections for these signals are shown in FIG. 2. The regulators in FIG. 2 are preferably connected in the delta configuration as shown in FIG. 1. However, for purposes of clarity, this connection arrangement is not illustrated in FIG. 2. FIG. 3A illustrates the presence of a converter unit resistor $R_L$ which fairly accurately portrays the load seen by the converter units. FIG. 3A also particularly illustrates the utilization of two silicon controlled rectifier devices ($SCR_1$ and $SCR_2$; reference numerals 31 and 32, respectively) to provide the desired phase switching capability. In normal operation, diodes $D_1$, $D_2$, $D_3$, and $D_4$ (reference numerals 21–24 respectively) provide a full wave rectifier bridge which converts power phases A and B to a DC current across a load. However, in the event that one of the phases fails, the converter is also supplied with a third phase which supplies current through the node that exists between silicon controlled rectifiers 31 and 32. Thus, phase switching is accomplished through the utilization of such SCR devices. To see how control of these devices is effected by means of signals supplied to their gates, see FIG. 6.

Figure 3B:
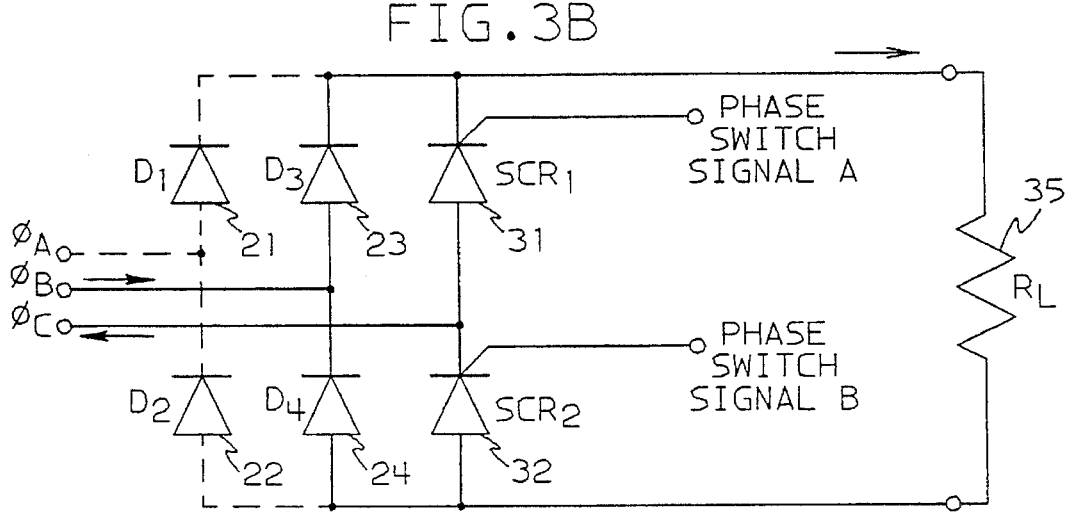
FIG. 3B is an electrical circuit diagram illustrating line conditions when one of the phases (phase A) fails.
Figure 3C:
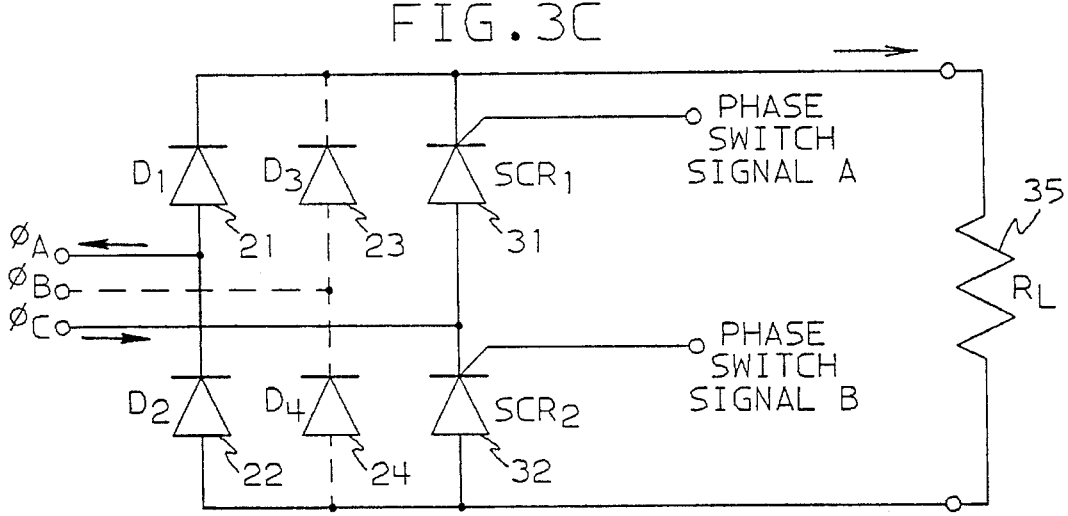
FIG. 3C is a diagram similar to FIG. 3B except that it more particularly illustrates the situation when phase B has failed.

FIGS. 3B and 3C more particularly illustrate the effective resultant converter configuration in the event that a failure occurs on phase A or phase B, respectively. In FIGS. 3B and 3C those portions of the circuit having dotted line conductors represent those portions of the circuit which are effectively removed by a phase outage.

Figure 4:
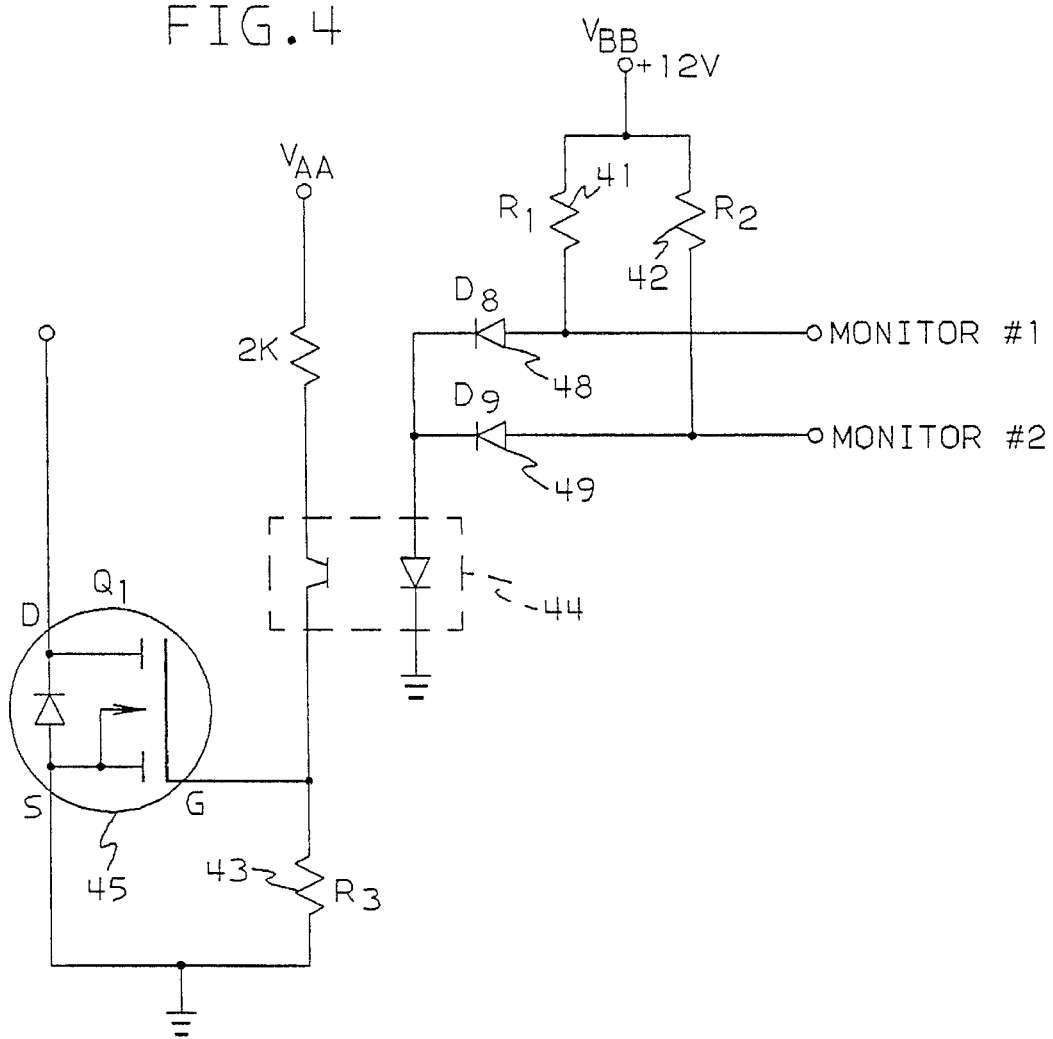
FIG. 4 is an electrical circuit diagram detailing the structure and function of the monitor ports shown in FIG. 2.

In the present invention, each regulator 10 has included therein a bridge converter unit such as illustrated in FIG. 3A and each one also includes means for monitoring other ones of the converters and/or regulators (as shown in FIG. 2). It is, however, noted that, for purposes of isolation in electrical power supply systems, opto-electrical isolators such as unit 44 in FIG. 4 are provided. In particular, resistors $R_1$ and $R_2$ (reference numerals 41 and 42) together with diodes $D_8$ and $D_9$ (reference numerals 48 and 49) form a two-input OR gate which is powered from bias supply voltage $V_{BB}$. When either of the signals on monitor lines 1 or 2 are "up", the light source in opto-electrical isolator 44 is energized so as to trigger the corresponding transistor in the isolator unit. This provides desirable electrical isolation. In effect, when a signal is present on either monitor #1 line or monitor #2 line, the switch in the secondary portion of opto-isolator 44 is closed, thus resulting in an increased voltage drop across resistor $R_3$ from bias voltage supply $V_{AA}$, thus producing a voltage at the gate of transistor $Q_1$ (reference numeral 45). Transistor $Q_1$, as shown in FIG. 4, is depicted as a FET device. However, it is also possible to employ a bipolar transistor in this role. The functioning of transistor $Q_1$ is however more particularly described below in the discussion referencing FIG. 6. However, suffice it to say here that the signals present on monitor lines #1 or #2 are employed to trigger the gate signal lines for $SCR_1$ and $SCR_2$ (reference numerals 31 and 32, respectively).

Figure 5:
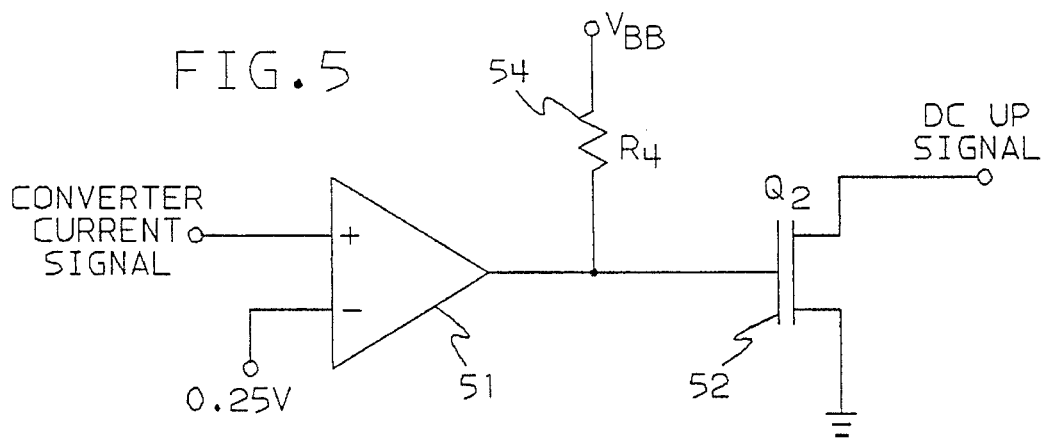
FIG. 5 is an electrical circuit diagram illustrating a preferred mechanism for providing a signal indicating that a converter unit is functioning appropriately.

The signals appearing on monitor lines #1 and #2 are derived from circuits present in regulators 10. In particular, such a circuit is shown in FIG. 5. It is seen therein that a converter current signal is supplied to comparator 51 which also receives a one quarter volt bias line. In particular, the converter current signal preferably ranges in value from zero volts to approximately four volts, thus indicating the current level being supplied by the respective converter unit. A converter current signal of zero volts means that no current is being supplied while a converter current signal level of approximately four volts preferably indicates that the converter is operating at a maximum current condition. The signal from comparator 51 is supplied to the base of transistor $Q_2$ (reference numeral 52) which also receives a bias current from supply $V_{BB}$ through resistor $R_4$ (reference numeral 54). One of two output signals from transistor $Q_2$ which is not attached to ground is supplied as the "DC UP" signal (See FIG. 2).

Figure 6:
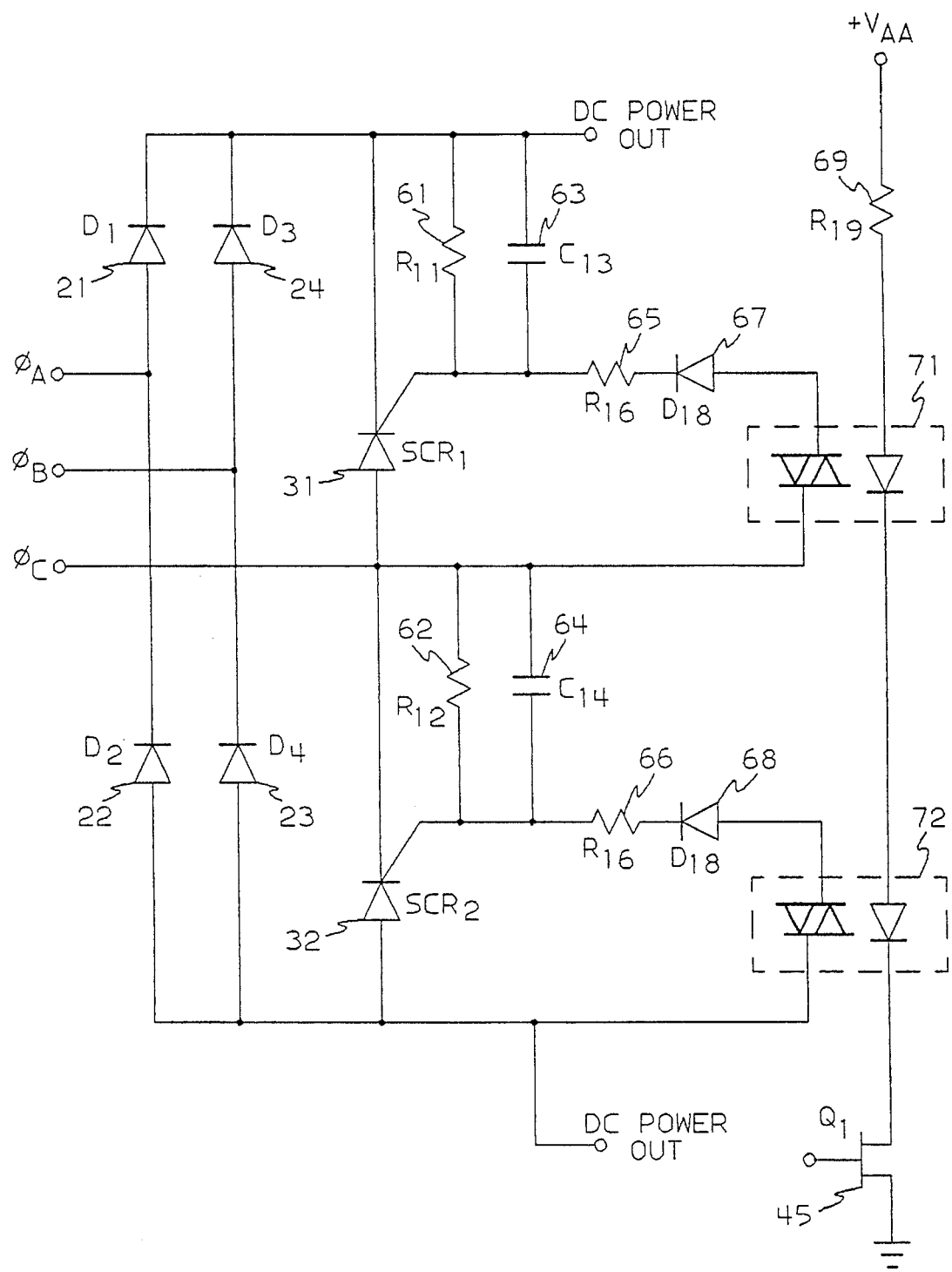
FIG. 6 is an electrical circuit diagram illustrating the connection between a pair of optical isolators and another optical isolator employed in a feedback path to control phase switching.

Operating through the isolator circuit shown in FIG. 4, the DC UP signals, which are supplied to the various monitor input ports, ultimately trigger the transition of transistor $Q_1$ (reference numeral 45 in FIGS. 4 and 6) into the ON state. In this state, it draws current from supply $V_{AA}$ through resistor 69 as shown in FIG. 6. The current through resistor R19 (reference numeral 69) into the diode portions of opto-isolators 71 and 72 causes the triggering of their corresponding but isolated triac devices. This signal is supplied from opto-isolator 71 through diode D17 (reference numeral 67) and resistor R15 (reference numeral 65) to the gate of $SCR_1$ (reference numeral 31). Likewise, the same current flowing through resistor R16 triggers a current flow through the triac portion of opto-isolator 72 through diode D18 (reference numeral 68) and resistor R16 (reference numeral 66) to the gate of $SCR_2$ (reference numeral 32). It is in this fashion that phase switching is accomplished when there is an indication that the DC UP signal is "not all that it should be". There is also provided in FIG. 6, resistors 61 and 62 (R11 and R12, respectively) which operate to provide protection against overcurrent conditions through the gates of $SCR_1$ and $SCR_2$ respectively. There is also preferably provided capacitors 63 and 64 (C13 and C14, respectively), as shown, to provide noise mitigation. DC power-out is as shown. It is further noted that FIGS. 4 and 6 are linked via transistor $Q_1$.

In a preferred embodiment of the present invention, the component values are as specified below:

| | | |
|---|---|---|
| $R_1$ | | 2K |
| $R_2$ | | 2K |
| $R_3$ | | 1K |
| $R_4$ | | 10KΩ |
| $R_{11}$ | | 1KΩ |
| $R_{12}$ | | 1KΩ |
| $C_{13}$ | | 0.1μF |
| $C_{14}$ | | 0.1μF |
| $R_{15}$ | | 100Ω |
| $R_{16}$ | | 100Ω |
| $R_{19}$ | | 390Ω |

| Component | Vendor | Type |
|---|---|---|
| opto-isolator 44 | Telefunken | CNY-65 |
| opto-isolator 71 | Motorola | MOC-3083 |
| opto-isolator 72 | Motorola | MOC-3083 |
| (D1,D2,D3,D4) | International Rectifier | 35MB140A |
| ($SCR_1$, $SCR_2$) | International Rectifier | B25DS120 |
| Q1 | Motorola | VN2222LL |
| Q2 | Motorola | VN2222LL |
| D8 | ROHM | 1N4531 |
| D9 | ROHM | 1N4531 |
| D17 | General Instruments | GI-GP10V |
| D18 | General Instruments | GI-GP10V |

From the above, it should be appreciated that the circuits shown in the accompanying figures are sufficient to achieve the objectives set out above. Accordingly, it is seen that the present inventors have advanced the state of the power supply arts by providing power converter units which are operable under fault conditions to provide phase switching capabilities. It is further seen that the power supply of the present invention can, under fault conditions, continue operation thus improving the reliability of a three-phase power supply system.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A self-balancing three-phase power supply comprising:

a plurality of power converters which accept three-phase power input, each said power converter for rectification of two of said phases and wherein at least one power converter is capable of switching to the use of the other phase;

function indicating means in each of said power converters for indicating that the respective converter is functioning; and monitor means in said at least one of said converters for monitoring the function indicating means of at least one other converter in said power supply and for activating the phase switching capability of said converter upon an indication of failure in at least one other power converter so as to effect switching to the use of the other phase in said power converter.

2. The power supply of claim 1 in which said plurality is 3.

3. The power supply of claim 1 in which said capability of switching to the use of said other phase is implemented by means of silicon control rectifiers.

4. The power supply of claim 1 in which all of said power converters are capable of switching to the use of the other phase.

5. The power supply of claim 1 in which said monitor means is present in each power converter.

6. The power supply of claim 1 in which said power converters are connected in a delta configuration.

\* \* \* \* \*